Nov. 11, 1952     P. B. MOORE     2,617,637
DRIP-EVAPORATING UNIT FOR AIR CONDITIONERS
Filed Jan. 29, 1951     2 SHEETS—SHEET 1

Inventor
Paul B. Moore

By Dodge and Ims

Attorneys

Nov. 11, 1952        P. B. MOORE        2,617,637
DRIP-EVAPORATING UNIT FOR AIR CONDITIONERS
Filed Jan. 29, 1951        2 SHEETS—SHEET 2
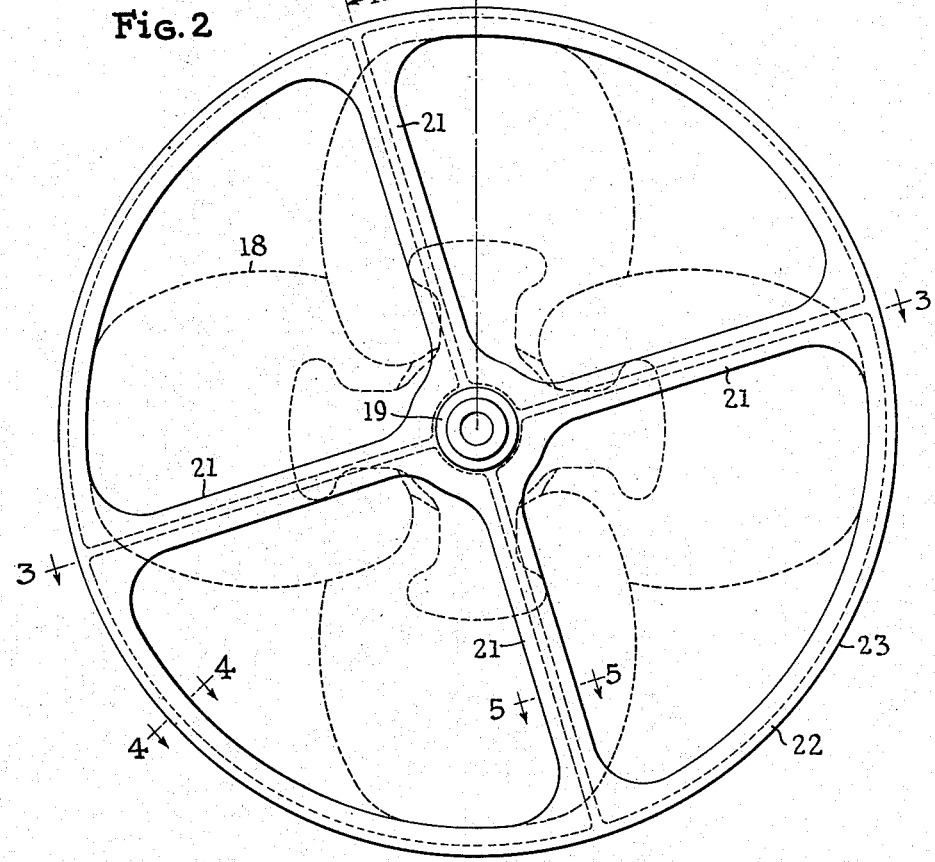
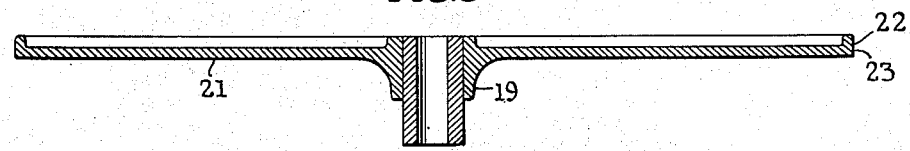
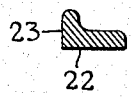 
Inventor
Paul B. Moore
Attorneys Patented Nov. 11, 1952

2,617,637

UNITED STATES PATENT OFFICE 2,617,637

DRIP-EVAPORATING UNIT FOR AIR CONDITIONERS

Paul B. Moore, York, Pa., assignor to York Corporation, York, Pa., a corporation of Delaware Application January 29, 1951, Serial No. 208,290

2 Claims. (Cl. 261—15)

1

This invention relates to air conditioners of the portable type and particularly to means for evaporating in the condenser air-stream the drip water condensed from the evaporator air-stream. Re-evaporation of drip water is standard practice in this art and the present invention involves details of arrangement which assure reliable re-evaporation even under adverse atmospheric conditions.

When the relative humidity of the indoor air approaches saturation, the maximum amount of drip water is condensed on the evaporator and must be disposed of. The corollary is that because the outdoor air will then also be nearly saturated, it is most difficult to re-evaporate the drip in the condenser air-stream.

The industry has established a test for portable units such that the evaporator and the condenser are each subjected to air whose dry bulb temperature is 80 and whose wet bulb temperature is 78. A satisfactory device must operate continuously for six hours under such conditions without overflowing. It has been found that a device which would pass this test would fail under conditions which commonly exist at times in certain localities, for example, along the Gulf coast in Texas in summer. The device here disclosed is the only one known to applicant which has consistently passed this test.

According to the invention, means are provided to accumulate in the device a substantial quantity of drip water which is effective to sub-cool refrigerant in the lower portion of the condenser and which takes up in the process a considerable amount of heat. Sub-cooling of condensed refrigerant is not new in this art, but it is one of the effects which in combination with others gives a high evaporation rate under unfavorable conditions.

Another important feature of the invention is that the housing is so contrived that up to the point of overflow, the only way that drip water can leave the device is by re-evaporation. It is repeatedly sprayed until evaporated.

In the prior art, no effort has been made so far as applicant is advised, to prevent the drip water from coming into contact with the blades of the condenser air fan. Where an ordinary bladed propeller type fan is used, there tends to be a back-flow in a zone immediately outside the path of the tips of the blades, and this back-flow will cause overflowing water to be thrown in all directions so that the fan becomes an active adverse factor. That action is inhibited by the arrangement of the fan within a fixed shroud, as is characteristic of the present invention.

2

To insure the necessary dependable performance, every detail has been refined. The result justifies the extensive study and care which have been devoted to the problem.

A successful embodiment of the invention will now be described with reference to the accompanying drawings in which:

Fig. 2 is an elevation of that side of the spray ring which is toward the fan. The fan blades are shown in broken lines to indicate the positional relationship between the spokes of the spray ring and the blades of the fan.

Figure 1:
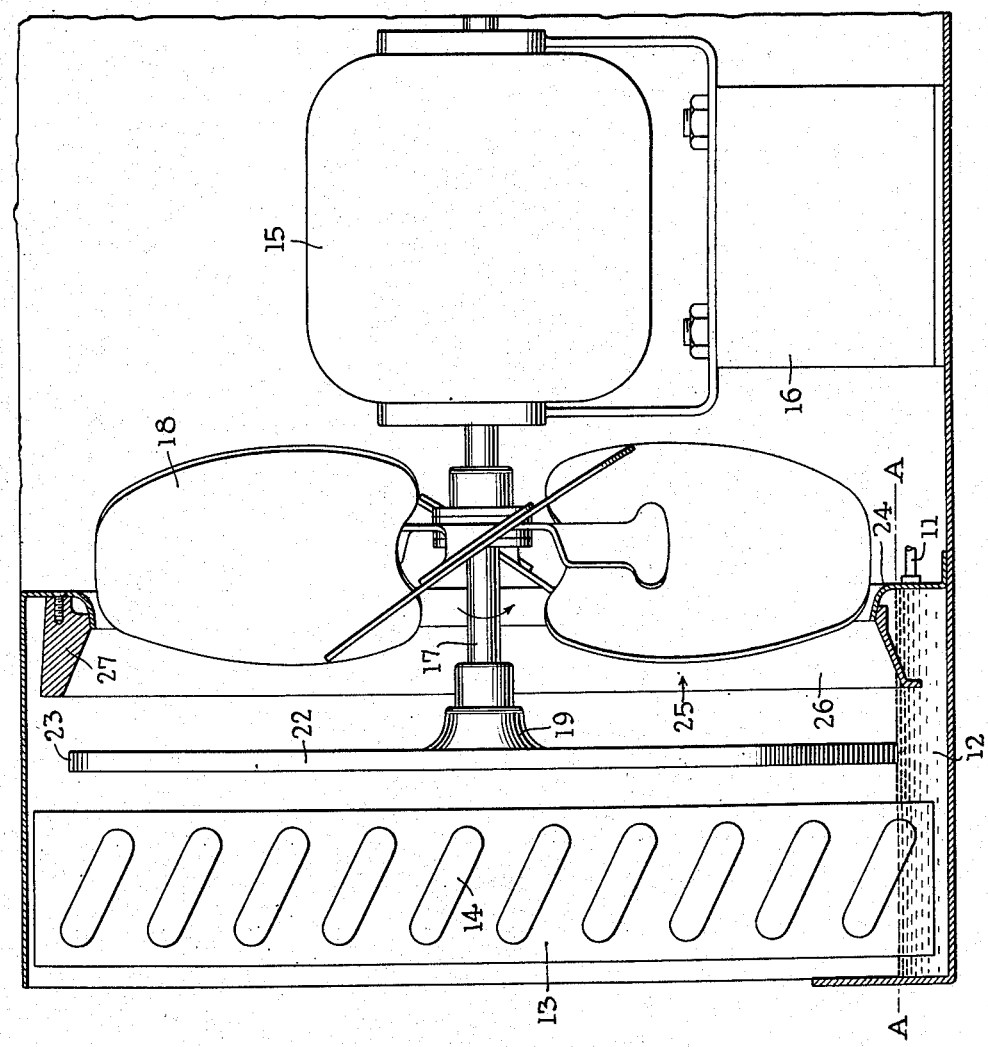
Fig. 1 is a view showing the condenser fan motor, the condenser air fan, the spray ring and the condenser in elevation with the housing and fixed shroud ring of the fan in vertical section.

Figs. 3, 4 and 5 are respectively sections on the lines 3—3, 4—4 and 5—5 of Fig. 2.

These conditioner units are based on a refrigerative circuit of the compressor-condenser-evaporator circuit type. A typical example of the complete conditioner according to the prior art is shown in the patent to Moore 2,316,704, April 13, 1943. In the drawings of the present application only the condenser fan, the motor which drives it, the sump, the condenser and closely related parts are shown. It will be understood, however, that the conditioner unit includes a compressor and an evaporator connected in the usual circuit with the condenser. The drip water is moisture condensed from the room air on the evaporator, and is drained from the evaporator to the sump for evaporation in the condenser-cooling air-stream.

A portion of the drip connection is illustrated at 11 in Fig. 1. In that figure the sump appears at 12. The condenser comprises a plurality of closely spaced vertical parallel fins 13. These are in thermal contact with the tubular passes of the condenser. The return bends 14 connect these tubular passes and are a part of them.

An electric motor 15 supported on a base 16, drives a shaft 17 on which is mounted a bladed fan 18 of the propeller type. The direction of rotation of the fan is indicated by an arrow in Fig. 1 and is clockwise when the shaft 17 is viewed from its lefthand end in Fig. 1. On the end of the shaft 17 and between the fan 18 and the condenser is the spray wheel. This comprises a hub 19 and four spokes 21 which extend radially to a circular rim 22. The spokes 21 are T-shaped in cross-section as indicated in Fig. 5 and the rim is L-shaped in cross-section as indicated in Fig. 4. The peripheral surface 23 of the rim is a cylinder as is clearly indicated in the drawings.

The relationship of the spokes 21 to the blades of fan 18 is important. As viewed in Fig. 2 the wheel turns counter-clockwise, the spokes and the fan blades are equal in number and the spokes have an angular lead as compared to the center line of the fan blades. Each spoke approximately bisects the angle between the leading edge of and the radial center-line of the corresponding blade. As a practical matter the center line of the spoke leads the center line of the corresponding fan blade by an angle between 14° and 17°. The angle is diagrammed in Fig. 2 and a legend stating the angular limits is there applied.

The space above the sump 12 is tightly enclosed as shown. The forward portion of the fan turns within a shroud ring formed in part by the flanged portion 24 of a vertical partition, and in part by an applied ring 25 whose interior surface 26 is a cone flaring in the direction of air flow. The ring is attached to the partition by screws which enter lugs 27. There may be three or four such lugs, the purpose being to insure rigidity without seriously impeding the drainage of any water which may deposit on the outer surface of the ring 26.

The shroud ring defines the entrance to the air path and affords gradual contraction which diminishes, then reverses and becomes a gradual expansion.

The diameter of the rim 23 of the spray wheel is such that the sump 12 will be filled nearly full (that is to the level indicated at A—A), when the rim first engages the surface of the water in the sump. Whenever the motor 15 is running, the fan and spray ring are both rotating, the ring atomizes water from the bath, and the fan blows it into contact with the fins 13 of the condenser.

The shroud 24, 25 is effective to smooth the air flow and keep water out of contact with the blades of the fan 18. Because of this fact and because of the fine atomization of the water by the spray wheel, a very good evaporative effect is secured.

The motor 15 runs at 1000 R. P. M. or more. The spray wheel is about 12" in diameter. Consequently the lineal speed of its rim is high. In the embodiment using a 12" spray wheel, the interval between the fins and the proximate face of the wheel is about 3/8" and the interval between the fan blades and the proximate face of the wheel is about 7/8". These dimensions are typical and are subject to some variation. This is particularly true where the design of the fan or the size of the spray wheel is modified. The dimensions are given, not with the intention of expressing limitations, but with the idea of disclosing the dimensions of one embodiment which has proved to be successful.

I claim:

1. In a drip-evaporating device, the combination of a sump; means for supplying drip-water thereto; a finned condenser mounted above and partly in said sump, so as to deliver heat to water in the sump and so that water draining from the fins of the condenser and warmed by contact therewith, is caught by the sump; enclosing walls defining an air path across said sump and out between the fins of the condenser; a propeller type fan mounted on a horizontal axis and positioned to force air through said defined path; a spray-wheel also mounted on a horizontal axis and adapted to contact the surface of water in the sump between the fan and the condenser and spray water into said path in a part thereof beyond said fan; a fixed shroud ring defining the entrance to said air-path and reversely flared to afford a gradual contraction of the air stream which gradually decreases and becomes a gradual expansion of the stream, said shroud being closely spaced from the trace of the fan-blade tips at the exit side of the fan and serving to resist peripheral reflux of air; and means for rotating said fan and wheel.

2. The combination defined in claim 1 in which the exit face of the fan is within the entrance portion of the shroud ring and the stream-expansion portion of the ring extends beyond the face of the fan in the direction of air-flow.

PAUL B. MOORE.

REFERENCES CITED

The following references are of record in the file of this patent:

UNITED STATES PATENTS

| Number | Name | Date |
| --- | --- | --- |
| 1,955,269 | Anetsberger et al. | Apr. 17, 1934 |
| 2,091,159 | Persons | Aug. 24, 1937 |
| 2,194,711 | Meyer et al. | Mar. 26, 1940 |
| 2,219,826 | Surnburne et al. | Oct. 29, 1940 |
| 2,538,879 | Newcomb et al. | Jan. 23, 1951 |